Nov. 29, 1932.   J. F. HAAS   1,889,441
COMBINED ROTARY AND RECIPROCATORY DRILL
Filed Aug. 30, 1930
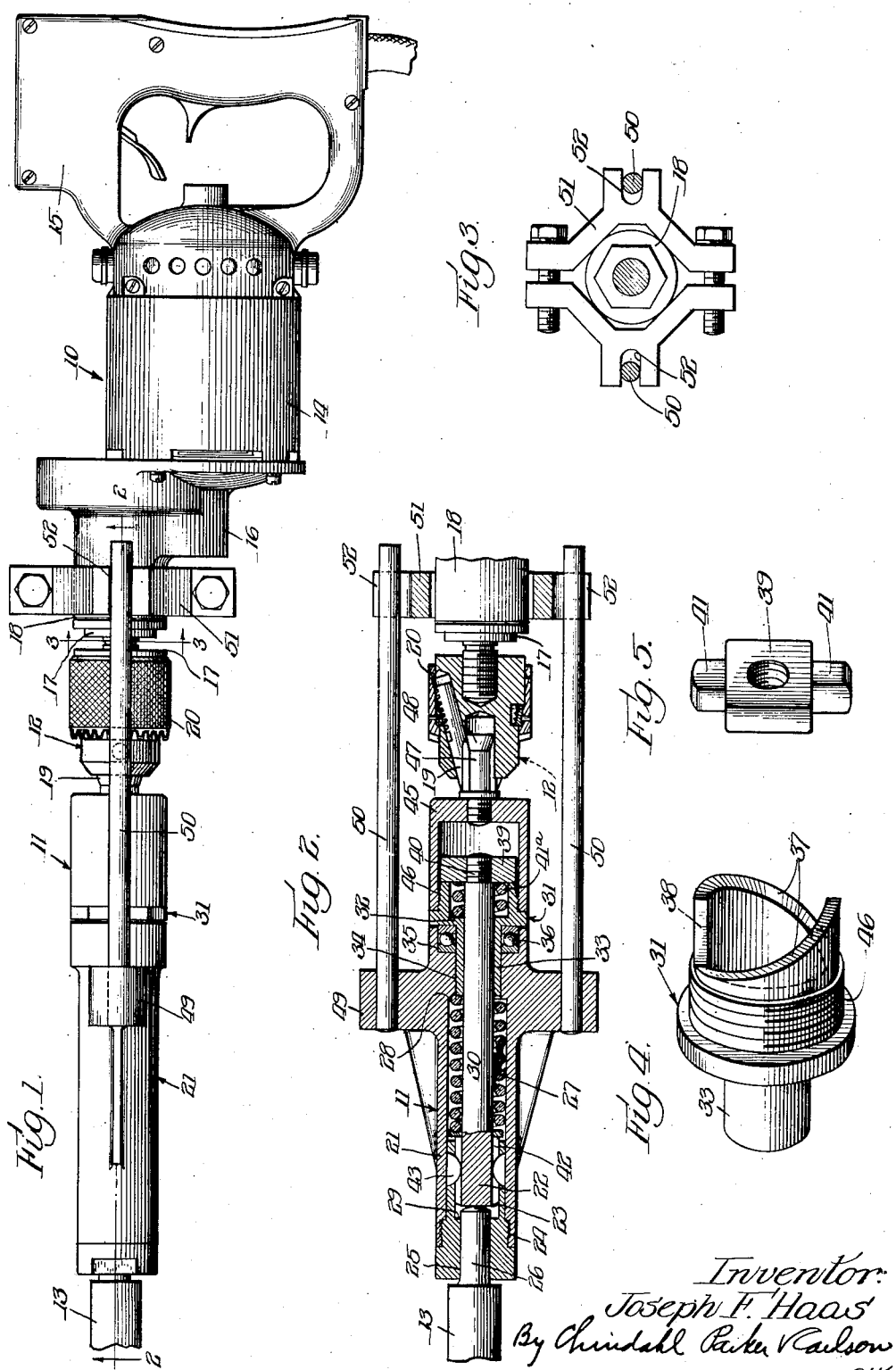
Inventor:
Joseph F. Haas
By Chindahl Parker & Carlson
attys Patented Nov. 29, 1932

1,889,441

UNITED STATES PATENT OFFICE

JOSEPH F. HAAS, OF FOREST PARK, ILLINOIS, ASSIGNOR TO WODACK ELECTRIC TOOL CORPORATION, OF CHICAGO, ILLINOIS, A CORPORATION OF ILLINOIS

COMBINED ROTARY AND RECIPROCATORY DRILL

Application filed August 30, 1930. Serial No. 479,069.

The invention relates generally to portable power operated drills and the general object is to provide a practical drill of this character adapted to produce either reciprocatory or rotary movement of a tool whereby to adapt the drill for a broad field of usefulness.

Another object is to provide a reciprocatory drill unit of compact, rugged construction which may be assembled and disassembled readily for inspection or repair and adapted to be detachably associated with a rotary power source such as the spindle of a rotary drill.

Other objects and advantages will be understood from the following description when taken in connection with the accompanying drawing in which:

Fig. 1 is a side elevational view of a drill embodying the invention in its preferred form.

Fig. 2 is a fragmental sectional view taken along the line 2—2 of Fig. 1.

Fig. 3 is a sectional view taken along the line 3—3 of Fig. 1.

Fig. 4 is an enlarged perspective view of the actuating cam of the reciprocatory drill unit.

Fig. 5 is an enlarged perspective view of the cam follower which is adapted to cooperate with the cam shown in Fig. 4.

While my invention is susceptible of embodiment in many different forms, I have shown in the drawing and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In the preferred form shown in the drawing, the drill is electrically operated and consists of two readily separable units, one of which is designated generally by the numeral 10 and when taken alone constitutes a motor-driven rotary drill, while the other unit is designated generally by the reference numeral 11 and constitutes a reciprocatory drill adapted to receive rotary motion from the chuck 12 of the rotary drill unit 10 and to convert this rotary motion into reciprocatory motion in a star drill bit 13.

The rotary drill unit 10 in the present case comprises a motor housing 14, one end of which carries a trigger-grip handle 15 of well-known construction for controlling the operation of the motor contained in the housing. Secured to the other end of the housing is a gear box or housing 16 in which is mounted speed reduction gearing (not shown) for driving a drill spindle 17 at a suitable speed. The drill spindle 17 is mounted in and projects from a cylindrical hub 18 which is formed integrally with the gear box 16 and projects therefrom so as to act as a bearing for the spindle 17.

On its projecting end the drill spindle 17 carries the chuck 12, the chuck being preferably of the collet type in which a plurality of jaws 19 are moved radially into contact with a tool by rotation of a knurled sleeve 20 mounted on the exterior of the chuck.

As above pointed out, the reciprocatory drill unit 11 is readily separable from the rotary drill unit 10 and as herein shown comprises a cylindrical casing 21 preferably formed from a casting, within one end of which a hammer 22 (Fig. 2) is reciprocably mounted. To provide a slidable bearing for the hammer 22, a sleeve 23 is screw threaded at 24 into one end of the casing 21. The sleeve 23 has a bore 25 of reduced size formed therein at its outer end into which a reduced shank 26 of the drill bit 13 is slidably fitted so as to lie in the path of hammer 22. The hammer 22 is yieldingly pressed toward the shank 26 of the drill bit by an expensive coil spring 27 acting between the hammer and a shoulder 28 formed within the casing near the other end thereof, the movement of the hammer toward the drill bit being limited by a shoulder 29 formed at the inner end of the tool-receiving bore 25 of the sleeve 23.

To periodically withdraw the hammer 22 against the force of the spring 27 and release it for impact with the tool shank 26, rotary cam means is preferably employed, which means is mounted on the end of the casing 21 opposite from the tool 13 and is arranged to act through a rod 30 attached to the hammer 22. The connecting rod 30 is preferably formed integrally with the hammer 22 and projects axially through the spring 27 and the casing 21 and out of the opposite end of the casing. About the projecting end of the rod 30 a rotatable cam member 31 (Figs. 2 and 4) is positioned.

The cam member 31 is of cylindrical form as shown in Fig. 4 with a transverse wall 32 at one end to which an axial bearing sleeve 33 is connected. When the cam member 31 is in its operative position the bearing sleeve 33 surrounds the rod 30 and projects into an elongated bearing 34 (Fig. 2) formed in the casing 21, and in a counter bore 35 in the casing, a ball thrust bearing 36 is positioned to engage the transverse wall 32 of the cam member. At its outer or open end, the cylindrical wall of the cam member 31 is shaped to provide two angularly disposed cam surfaces 37 each extending through 180° and terminating abruptly as indicated in 38 in Fig. 4. Thus, a cam follower 39 screw-threaded at 40 onto the projecting end of the rod 30 and having oppositely projecting arms 41 (Fig. 5) engaging the cam surfaces 37 may be moved against the force of the spring 27 by rotation of the cam 31 relative to the rod 30. During such rotation of the cam 31, the rod 30 is held against rotation with the cam by a pair of key-ways 42 formed in the hammer 22 and engaged by keys 43 fixed in the bearing sleeve 23.

For the purpose of detachably connecting the units 10 and 11 together and forming a power-transmitting connection between the chuck 12 and the cam 31, a head 45 is rotatably mounted on the casing 21. The head 45, in the present instance, is of cup-shaped form and is positioned about the cam 31 with its open end screw-threaded to the cam 31 as indicated at 46 in Figs. 2 and 4, and on its closed end the head 45 carries an axially projecting shank 47 adapted to extend into and be secured in the chuck 12. The shank 47 preferably has an enlarged outer end 48 which is engaged by the chuck jaws 19 to prevent axial withdrawal of the shank from the chuck.

Thus when the shank 47 is gripped in the chuck 12, the cam 31 will be rotated with the chuck, and to hold the casing 21 of the reciprocatory drill unit 11 against rotation with the cam 31, means is provided to interengage the casings of the two units. This means preferably comprises two arms 49 formed integrally with the casting which forms the casing 21 and projecting from the opposite sides thereof, with a pair of rods 50, one fixed in each of the arms 49. The rods 50 extend parallel to each other along the opposite sides of the casing 21 past the cam 31 and its housing, and the projecting ends of the two rods 50 are adapted operatively to engage the gear housing 16 of the rotary drill unit.

To provide for such engagement a two part yoke 51 is clamped about the hub 18 of the rotary drill unit as shown in Figs. 1, 2 and 3 and a pair of radial notches 52 formed in the parts of the yoke 51 are adapted to receive the ends of the rods 50.

The impact of the arms 41 of the cam follower against the lower portion of the cam surfaces 37 is preferably cushioned by an expansive spring $41^a$ positioned about the rod 30 within the cylindrical wall of the cam 31 and acting between the transverse wall 32 of the cam member and the cam follower 39. The cushioning spring $41^a$ also reduces the shock upon the chuck 12, particularly when the drill is running idle, since it reduces the force with which the hammer 22 strikes the shoulder 29.

Thus, to assemble the two units 10 and 11 the two projecting ends of the rods 50 may be slid axially into the notches 52 until the shank 47 of the reciprocatory drill unit is positioned within the open jaws of the chuck 12, whereupon the chuck may be tightened securely about the shank 47. The rods 50 will then hold the casing 21 against rotation with the cam 31 when it is rotated by the chuck 12. Since the cam follower 39 is held against rotation through the action of the keys 43, such rotation of the chuck and the cam 31 will result in rapid reciprocation of the hammer 22 which will produce a rapid series of impacts upon the shank of the tool 13.

The rotary drill unit 10 is in the present case arranged to rotate the chuck 12 in a right hand direction and the screw-threaded connection 46 between the head 45 and the cam member 31 and the connection 40 between the cam follower 39 and the rod 30 are therefore made by means of right hand threads, while the connection 24 between the guide sleeve 23 and the casing 21 is made by means of a left hand thread. This construction prevents disengagement of the parts during operation of the unit 11 and also facilitates the disassembly of the unit. Thus if it is desired to remove the cam follower 39, the guide sleeve 23 and the cam member 31 are engaged by suitable tools and the cam member is rotated in a left hand direction relative to the sleeve 23. As the cam member 31 is rotated, the abrupt shoulders 38 thereof engage and rotate the cam follower 39 in a left hand direction and thereby unscrew the cam follower from the rod 30.

The cam follower 39 may also be detached from the rod 30 by first removing the head 45 and then projecting a suitable tool through the tool socket 25 to force the cam follower 39 axially away from the cam member 31. When this has been done the cam follower 39 may be unscrewed from the rod 30. A similar procedure may be followed in assembling the parts of the unit 11.

From the foregoing it will be clear that the construction of the reciprocatory drill unit is of an unusually practical character which is of advantage to the user because of the ease with which it may be assembled and disassembled. It is also of advantage to the manufacturer since it enables a one piece casing to be used. This results from the fact that the detachable element of the spring-hammer assembly (that is, the cam follower 39) is held in its operative position by yielding means and may be forced away from its operative position and into a position wherein it may be readily detached for the purpose of assembling or disassembling the unit.

The reciprocatory drill unit is of a compact rugged construction due in a large measure to the use of a one piece casing and it may be readily attached to or detached from the rotary drill unit. Since the enlarged end 48 on the shank 47 cooperates with the chuck to hold the two units in the desired axial position, the rods 50 serve to prevent relative rotation of the casings of the two units. It will be noted that the assembling operation is quite simple because of the fact that the two units can be moved into operative position by a single axial movement.

The two rods 50 being positioned on diametrically opposite sides of the axis of unit 11 serve to insure a balanced transmission of forces between the two units whereby to avoid breaking or distortion of the parts.

By providing the keys and key-ways in the guide sleeve and the hammer, it is possible to make the bearing sleeve 33 on the cam member 31 unusually long so as to insure proper operation of the cam. The long bearing sleeve also enables the cam and the attached shank 47 to function efficiently and to cooperate with the rods 50 in maintaining the reciprocatory drill unit in the desired relation to the rotary drill unit.

I claim as my invention:

1. A tool of the class described comprising an elongated cylindrical casing, a hammer mounted in one end of said casing for limited reciprocation longitudinally thereof, means providing a mounting for a drill bit at said end of the casing in the path of said hammer, means acting between said casing and said hammer to prevent relative rotation in one direction, a coiled spring acting between said hammer and said casing to force said hammer toward said drill bit, a rod non-rotatably fixed to said hammer and projecting through said spring and out of the other end of said casing, a cam member surrounding the projecting end of said rod, a bearing sleeve connected to said cam member and projecting along said rod substantially to the adjacent end of said spring, said casing having a bearing formed therein to rotatably support said bearing sleeve, a thrust bearing acting between said cam member and said casing to receive the longitudinal thrust of the cam member, and a cam follower detachably secured on the projecting end of said rod to cooperate with said cam to periodically withdraw said hammer upon relative rotation of said cam member and said casing.

2. A tool of the character described comprising a cylindrical casing, a hammer within said casing, a sleeve removably secured in one end of the casing and surrounding and guiding said hammer for reciprocation, said sleeve and said hammer being inter-engaged to prevent relative rotation during such reciprocation, abutment means within said sleeve to limit movement of said hammer outwardly of the casing, a spring acting between said hammer and a shoulder in said casing to press said hammer toward said abutment, a rod non-rotatably secured to said hammer and projecting from the other end of said casing, a cam member surrounding said projecting end of the rod and mounted on said other end of the casing for rotation about the axis of the rod, and a cam follower detachably secured to said projecting end of said rod and extending laterally therefrom to engage said cam.

3. A device of the character described comprising a cylindrical casing, a hammer reciprocably and non-rotatably mounted therein, a removable abutment near one end of the casing limiting movement of said hammer in a first direction, a spring mounted within the casing and operable to press said hammer toward said abutment, a rod connected to said hammer and projecting from the other end of the casing, a cam member surrounding said projecting end of the rod and rotatably mounted on said casing, a cooperating cam follower removably secured on said projecting end of the rod, a housing surrounding and removably secured to said cam to transmit rotation thereto, means on said housing adapted to be drivingly engaged with the chuck of a rotary power drill, and means carried by said cylindrical casing adapted to engage the frame of such a drill to hold said frame and casing against relative rotation.

4. A two-unit drilling device comprising, in combination, a power-driven rotary-drill unit having a housing and a driven tool-chuck, a detachably associated reciprocatory-drill unit having an elongated casing, a hammer in said casing, means for operating said hammer including a non-rotatable cam element and a rotatable cam element extending axially from one end of said casing and adapted to be engaged and rotated by said chuck and a spring acting against said casing and one of said cam elements to maintain said parts in assembled relation when said units are separated, a pair of substantially rigid members extending longitudinally from said casing on opposite sides of the axis thereof past said element and adapted to extend along opposite sides of said housing, means on opposite sides of said housing engageable with said members to prevent relative rotation of said casing and said housing, and cooperating abutment means on said two units concentrically arranged about the axes of said casing and said drill-chuck operable to prevent separation of the two units longitudinally of said axes.

5. A hammer attachment for portable power drills comprising an elongated body having an axially slidable tool in the outer end thereof, a plunger reciprocable axially of the body in operative relation to said tool and projecting from the inner end of the body, an actuating spring for said plunger tending to move it outwardly in the body, an annular member through which said projecting end of the plunger passes, a cam follower fixed on the plunger, said annular member having an inner cam face with which said follower coacts, and a hollow rotatable actuating element having said cam member fixed thereto and coacting with said body to enclose the cam follower and the cam member, said body having means for holding it in non-rotating relation to a power drill and said actuating element having means for detachably connecting it with the drill spindle.

6. A hammer attachment for portable power drills comprising an elongated body having an axially slidable tool in one end, a plunger reciprocable axially of the body in operative relation to said tool and projecting from the opposite end of the body, a cam follower fixed on the projecting end of the plunger, a hollow rotatable actuating element providing a chamber for receiving said cam follower, one end of said chamber having an opening therein to receive the projecting end of said plunger and the other end of the chamber having a closing end wall, said actuating element having adjacent the open end of the chamber a cam member rotatable with the element, said cam follower coacting with said cam member in its rotation to move the plunger in one direction, a spring acting upon said plunger tending to move it in the opposite direction, means on said closing end wall of said actuating element adapted to be detachably connected with the driving spindle of a power driven drill, and a part on said body adapted to engage with a part on said drill to hold the body against rotation.

7. A hammer attachment for rotatable drills comprising an elongated body having an axially slidable tool in the outer end thereof, a plunger reciprocable axially of the body in operative relation to said tool and projecting from the inner end of the body, a hollow rotatable actuating element bearing against the inner end of the body and encircling said projecting end of the plunger, said element having fixed thereto an annular cam member also encircling the plunger, a cam follower on the plunger coacting with said cam member, and a spring acting on said plunger to hold said follower in engagement with the cam member and also acting through said cam member to hold the actuating member in bearing relation to the body, said actuating element having means providing a detachable connection with a spindle of a power driven drill and said body having means for engaging a part of said drill for holding the body against rotation.

8. A hammer attachment for rotatable drills comprising an elongated body having an axially slidable tool in the outer end thereof, a plunger reciprocable axially of the body in operative relation to said tool and projecting from the inner end of the body, a hollow rotatable actuating element bearing against the inner end of the body and encircling said projecting end of the plunger, said element having fixed thereto an annular cam member also encircling the plunger, a cam follower on the plunger coacting with said cam member, a spring acting on said plunger to hold said follower in engagement with the cam member, and a cushioning spring housed in said element and adapted to be engaged by said follower when released by said cam, said actuating element having means for engaging a part of said drill for holding the body against rotation.

9. A device of the class described comprising a rotary drill having a housing and a driven tool chuck, a reciprocatory drill unit having a casing, a spring hammer in said casing, a rotatable actuating element for said hammer projecting from said casing and adapted to be drivingly connected to said chuck, a pair of rods secured on opposite sides of said casing and extending longitudinally past said element, and a clamp adapted to be secured on said housing and providing a pair of notches for engagement by said rods to prevent relative rotation of the casing and said housing.

In testimony whereof, I have hereunto affixed my signature.

JOSEPH F. HAAS.